US008943660B2

(12) United States Patent
Titera

(10) Patent No.: US 8,943,660 B2
(45) Date of Patent: Feb. 3, 2015

(54) HUB PULLING DEVICE AND METHOD FOR USE

(76) Inventor: Jerry Titera, Bagley, MN (US)

( * ) Notice: Subject to any disclaimer, the term of this patent is extended or adjusted under 35 U.S.C. 154(b) by 167 days.

(21) Appl. No.: 13/546,661

(22) Filed: Jul. 11, 2012

(65) Prior Publication Data

US 2014/0013567 A1 Jan. 16, 2014

(51) Int. Cl.
*B23P 19/04* (2006.01)
*B23P 19/00* (2006.01)

(52) U.S. Cl.
USPC .......................................... 29/245; 29/426.1

(58) Field of Classification Search
CPC ...... B25B 27/023; B25B 27/02; B25B 27/00; F16B 29/109; B60B 31/06
USPC ........... 29/426.1, 426.5, 402.01, 402.03, 259, 29/263, 264, 266, 281.4, 245
See application file for complete search history.

(56) References Cited

U.S. PATENT DOCUMENTS 4,642,866 A * 2/1987 Murtaugh ...................... 29/259

* cited by examiner

*Primary Examiner* — John C Hong
(74) *Attorney, Agent, or Firm* — Geiser Law, PLLC; Greg N. Geiser

(57) ABSTRACT

A hub pulling device for the removal of a hub from the axel of a vehicle. The device includes a pin and plate. The plate having a central bore having a sidewall supported by a plurality of gussets. The plate containing a plurality of apertures aligned to be received on the lug bolts of the hub. The pin having a head sized for receipt within the hub center and engagement of the axel and a shaft sized for receipt within the central bore. To remove a hub, the pin is placed within the central bore and the plate is mounted to the lug bolts using the lug nuts, the opposed force of the pin pushing on the axel and the plate pulling the hub frees the hub.

8 Claims, 2 Drawing Sheets

HUB PULLING DEVICE AND METHOD FOR USE

CROSS REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to a device that allows a user to easily remove a hub from the axel of a vehicle. More specifically the device is configured to remove the hub from the axel of a Bobcat® brand skid-steer loader.

BACKGROUND OF THE INVENTION

A standard skid-steer loader or skid loader, as they are sometimes called, is a small, but versatile, utility vehicle containing a rigid frame, a pair of lift arms, and four wheels. The wheels of the skid-steer operate in a synchronized fashion on each side, such that device can maneuver quickly and easily by turning one side of wheels faster than the opposed side. This configuration allows the skid-steer to complete tasks in several construction, farm, and utility environments in all seasons and weather with ease.

Although the skid-steer is an extremely capable device, it is the conditions the skidsteer operates within that make maintenance difficult, especially the drive components. The operation of the skid-steer within cold, wet, muddy, and dirty environments tends to seal parts together making separation difficult. This is especially true when attempting to remove the hub from the axel. Currently, to remove the hub from the axel, individuals result to all types of removal devices such as, hammers, bottle jacks, torches, and other similar and drastic measures. Therefore, there is a need for a device that quickly and easily removes a stuck hub from the axel of a skid-steer.

SUMMARY OF THE INVENTION

A hub pulling device and method of use is provided that quickly and easily removes the hub from an axel of a vehicle. More particularly this device is configured to remove the hub from the axel of a skid-steer. The device includes a circular plate forming a flange with a plurality of through holes aligned to receive the lug bolts of the hub, a center bore centrally located within the plate, the center bore having a circular sidewall defining a circumference of the central bore, a plurality of gussets in communication with the plate and supporting the sidewall, and a pin removably received within the central bore.

The pin has a head and a shaft. The shaft is attached to the head and extends to a first end opposite the head. The shaft has a diameter less than to the diameter of the central bore, wherein the shaft is slidably received within the central bore and a length greater than the height of the sidewall, wherein the shaft protrudes from the sidewall in a fully engaged position. The head has a diameter greater than the diameter of the shaft and the central bore, wherein receipt of the pin into the central bore is restrained from further receipt by the head. The head has a hub engagement surface and a plate engagement surface and is located on a second end of the shaft proximal to the hub when inserted into the center bore.

The hub engagement surface is configured to be received within the center of the hub and has a chamfered edge to securely engage the center of the hub and provide an opposing force to the axel as the plate is tightened to the lug nuts. The plate engagement surface engages the plate when the pin is inserted into the center bore.

A spacer is provided for use on larger hubs. The spacer has an interior diameter corresponding to the diameter of the shaft for receipt on the shaft and an outer diameter corresponding to the diameter of the head, wherein the spacer is placed onto the shaft as an extension of the height of the head.

In the preferred embodiment of the present invention, the plate is constructed out of ¼ inch steel for its strength and durability. Preferably the pin is constructed out of a single piece of material for durability and precision.

In use, a user will remove the wheel from the vehicle along with the dust cover from the center of the hub. The user will then place the pin into the center bore with the head of the pin aligned proximal to the hub by engaging the plate engagement surface with the plate, wherein the shaft extends through the central bore culminating in the first end distal the second end.

The user will then align the apertures of the plate with the lug bolts and place the plate with the pin engaged onto the lug bolts. In this position, the pin will be properly aligned to the center of the hub. The user will then begin to evenly tighten the lug nuts onto the lug bolts in an alternate pattern, wherein the user will tighten a bolt and then the nut directly opposite the bolt tightened. After repeated tightening, the hub should come free due to the opposed forces of the pin pushing on the axel while the hub is being pulled by the plate. If the hub is not coming free, the user may rap the pin at the first end of the shaft with a maul to further loosen the hub.

On larger diameter hubs, the spacer may be required to properly engage the axel. In this configuration, the spacer is placed onto the pin and seated adjacent to the head, the pin is then placed into the central bore and the plate is placed onto the lug bolts for equal tightening.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

Figure 1:
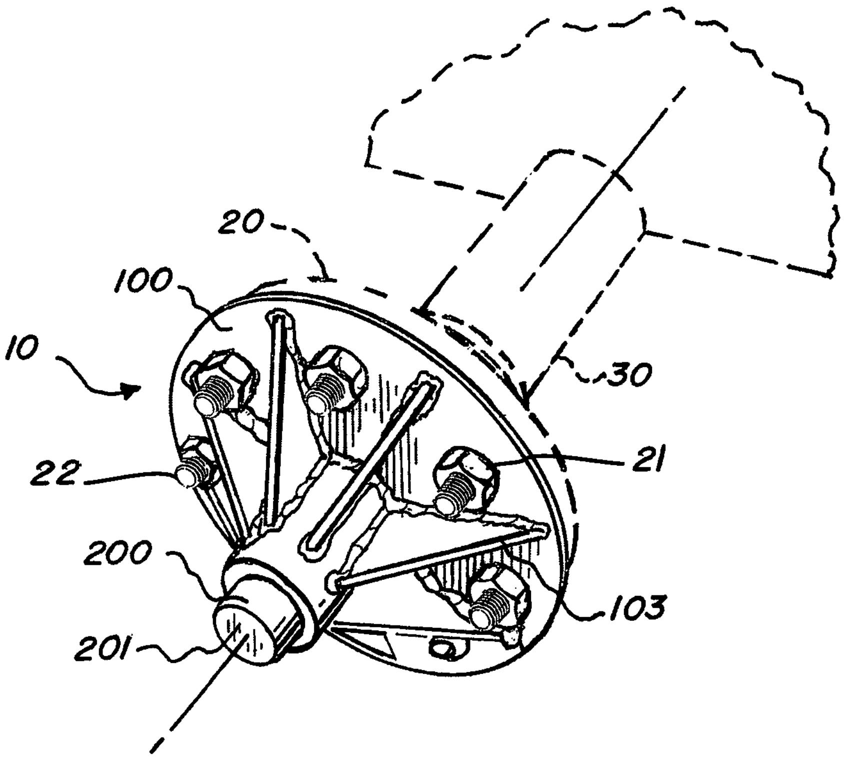
FIG. 1 is a perspective view of the device in use, according to the present invention.
Figure 3:
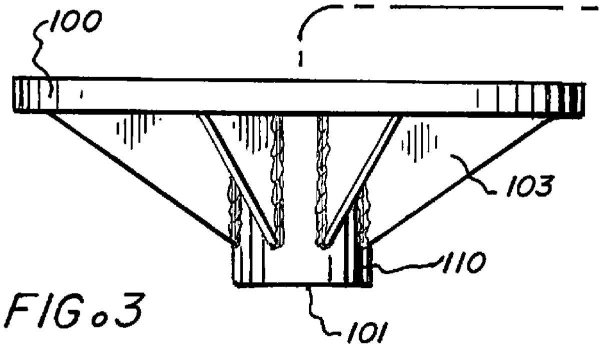
FIG. 3 is a side view of the device, according to the present invention.
Figure 3A:
FIG. 3A is a side view of the spacer of the device, according to the present invention.
Figure 3B:
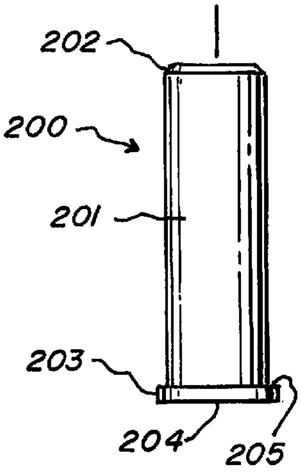
FIG. 3B is a side view of the pin of the device, according to the present invention.
Figure 2:
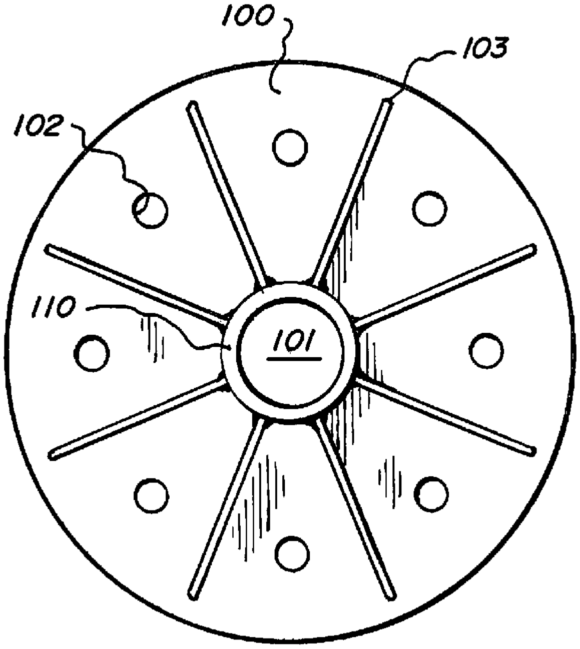
FIG. 2 is a top view of the plate of the device, according to the present invention.

Referring now to FIG. 1-FIG. 3B there is shown an embodiment of the hub pulling device of the present invention, generally designated by the reference numeral 10 designed to quickly and easily removes the hub 20 from an axel 30 of a vehicle. More particularly, this device 10 is configured to remove the hub 20 from the axel 30 of a skid-steer. The device 10 includes a circular plate 100 forming a flange with a plurality of through holes 102 aligned to receive the lug bolts 22 of the hub 20, a center bore 101 centrally located within the plate 100, the center bore 101 having a circular sidewall 110 defining a circumference of the central bore 101, a plurality of gussets 103 in communication with the plate 100 and supporting the sidewall 110, and a pin 200 removably received within the central bore 101.

The pin 200 has a head 203 and a shaft 201. The shaft 201 is attached to the head 203 and extends to a first end 202 opposite the head 203. The shaft 201 has a diameter less than the diameter of the central bore 101 and a length greater than the height of the sidewall 110, wherein the shaft 201 is slidably received within the central bore 101 and protrudes from the sidewall 110 in a fully engaged position. The head 201 has a diameter greater than the diameter of the shaft 201 and the central bore 101, wherein receipt of the pin 200 into the central bore 101 is restrained from further receipt by the head 203. The head 203 has a hub engagement surface 204 and a plate engagement surface 205 and is located on a second end of the shaft 201 proximal to the hub when inserted into the center bore 101.

The hub engagement surface 204 is configured to be received within the center of the hub 20 and has a chamfered edge to securely engage the center of the hub 20 and provide an opposing force to the axel 30 as the plate 100 is tightened to the lug nuts 21. The plate engagement surface 205 engages the plate when the pin 200 is inserted into the center bore 101.

A spacer 300 is provided for use on larger hubs 20. The spacer has an interior diameter corresponding to the diameter of the shaft 201 for receipt on the shaft 201 and an outer diameter corresponding to the diameter of the head 203, wherein the spacer 300 is placed onto the shaft 201 as an extension of the height of the head 203.

In the preferred embodiment of the present invention, the plate 100 is constructed out of ¼ inch steel for its strength and durability. Preferably, the pin 200 is constructed out of a single piece of material for durability and precision.

In use, a user will remove the wheel from the vehicle along with the dust cover from the center of the hub 20. The user will then place the pin 200 into the center bore 101 with the head 203 of the pin aligned proximal to the hub 20 by engaging the plate engagement surface 205 with the plate 100, wherein the shaft first end 202 extends through the central bore 101.

The user will then align the apertures 102 of the plate 100 with the lug bolts 22 and place the plate 100 with the pin 200 engaged onto the lug bolts 22. In this position, the pin 200 will be properly aligned to the center of the hub 20. The user will then begin to evenly tighten the lug nuts 21 onto the lug bolts 22 in an alternate pattern, wherein the user will tighten a nut 21 onto a bolt 22 and then the nut 21 onto the bolt 22 directly opposite the nut 21 and bolt 22 previously tightened. After repeated tightening, the hub 20 should come free due to the opposed forces of the pin 200 pushing on the axel 30 while the hub 20 is being pulled by the plate 100. If the hub 20 is not coming free, the user may rap the first end 202 of the pin 200 with a maul to further loosen the hub 20.

On larger diameter hubs 20, the spacer 300 may be required to properly engage the axe 30. In this configuration, the spacer 300 is placed onto the pin 200 and seated adjacent to the head 203, the pin 200 is then placed into the central bore 101 and the plate 100 is placed onto the lug bolts 22 for equal tightening.

The invention claimed:

1. An apparatus for the removal of a hub from an axel of a vehicle, the apparatus comprising:
- (a) a plate, the plate comprising:
  - (i) a plurality of apertures aligned with a plurality of lug bolts of the hub;
  - (ii) a central bore, the central bore having a cylindrical sidewall; and
  - (iii) a plurality of gussets attached to the plate and the sidewall, wherein the gussets strengthen and support the sidewall; and
- (b) a pin, the pin comprising:
  - (i) a shaft, the shaft having a diameter for slideable receipt within the central bore, the shaft extending beyond the height of the sidewall during receipt within the central bore at a first end; and
  - (ii) a head, the head attached to the shaft opposite the first end and having a hub engagement surface and a plate engagement surface, wherein the receipt of the shaft within the central bore is restrained by the head.

2. An apparatus according to claim 1, wherein the apparatus includes a spacer, the spacer sized to be received on the shaft and restrained by the head, wherein the spacer extends the height of the head.

3. An apparatus according to claim 1, wherein the pin is constructed out of a single piece.

4. An apparatus according claim 1, wherein the plate is constructed out of one quarter inch steel.

5. An apparatus for the removal of a hub from an axel of a vehicle, the apparatus comprising:
- (a) a plate, the plate comprising:
  - (i) a plurality of apertures aligned with a plurality of lug bolts of the hub;
  - (ii) a central bore, the central bore having a cylindrical sidewall; and
  - (iii) a plurality of gussets attached to the plate and the sidewall, wherein the gussets strengthen and support the sidewall;
- (b) a pin, the pin comprising:
  - (i) a shaft, the shaft having a diameter for slideable receipt within the central bore, the shaft extending beyond the height of the sidewall during receipt within the central bore at a first end; and
  - (ii) a head, the head attached to the shaft opposite the first end and having a hub engagement surface and a plate engagement surface, wherein the receipt of the shaft within the central bore is restrained by the head; and
- (c) a spacer, the spacer sized to be received on the shaft and restrained by the head, wherein the spacer extends the height of the head.

6. An apparatus according to claim 5, wherein the pin is constructed out of a single piece.

7. An apparatus according claim 5, wherein the plate is constructed out of one quarter inch steel.

8. A method for the removal of a hub from a vehicle using a plurality of lug bolts of the hub, the method comprising:
- (a) removing a wheel from the vehicle by removing a plurality of lug nuts from the lug bolts;

(b) removing a dust cover from a center of the hub, exposing a axel of the vehicle;

(c) placing a pin containing a head and a shaft into a central bore of a plate, the plate containing a plurality of apertures aligned with the lug bolts and the central bore aligned with the hub center and the axel of the vehicle;

(d) placing the plate with the pin engaged in the central bore onto the hub of the vehicle by aligning the lug bolts with the plurality of the apertures of the plate and the pin with the hub center engaging the axel; and (e) placing the lug nuts onto the lug bolts and tightening in an alternating pattern.

* * * * *